United States Patent [19]

Gregg

[11] 4,442,935

[45] Apr. 17, 1984

[54] PALLET MAGAZINE

[75] Inventor: Hans Gregg, Woerthsee, Fed. Rep. of Germany

[73] Assignee: Carl Hurth Maschinen- und Zahnradfabrik GmbH & Co., Munich, Fed. Rep. of Germany

[21] Appl. No.: 281,525

[22] Filed: Jul. 8, 1981

[30] Foreign Application Priority Data

Sep. 4, 1980 [DE] Fed. Rep. of Germany ....... 3033373

[51] Int. Cl.³ .............................................. B65G 35/08
[52] U.S. Cl. .................................... 198/648; 198/795; 198/836
[58] Field of Search ............... 198/343, 472, 580, 795, 198/836, 840, 648

[56] References Cited

U.S. PATENT DOCUMENTS 3,848,726 11/1974 Wiemer ................................ 198/795
4,062,444 12/1977 Nakov et al. ....................... 198/648
4,088,220 5/1978 Jacksch et al. ..................... 198/472

Primary Examiner—James L. Rowland
Attorney, Agent, or Firm—Flynn, Thiel, Boutell & Tanis

[57] ABSTRACT

A pallet magazine for transporting workpieces from a loading station to an unloading station, and possibly past a working station, has two parallel, endless conveyor chain loops supported on and driven by spaced pairs of sprocket wheels having horizontal axes. A plurality of pallets for carrying the workpieces are adapted to rest slidably on the upper sections of the chains and to hang freely from the lower sections of the chains. A further sprocket wheel is provided between the sprocket wheels of each said pair thereof, and a rack adapted to engage the further sprocket wheels is provided on the underside of each pallet. Each pallet has lateral guide rollers with horizontal axes which engage semicircular guide members provided adjacent the sprocket wheels. A guide rail extends between the further sprocket wheels and is received between spaced guide projections provided on the pallet racks.

7 Claims, 5 Drawing Figures

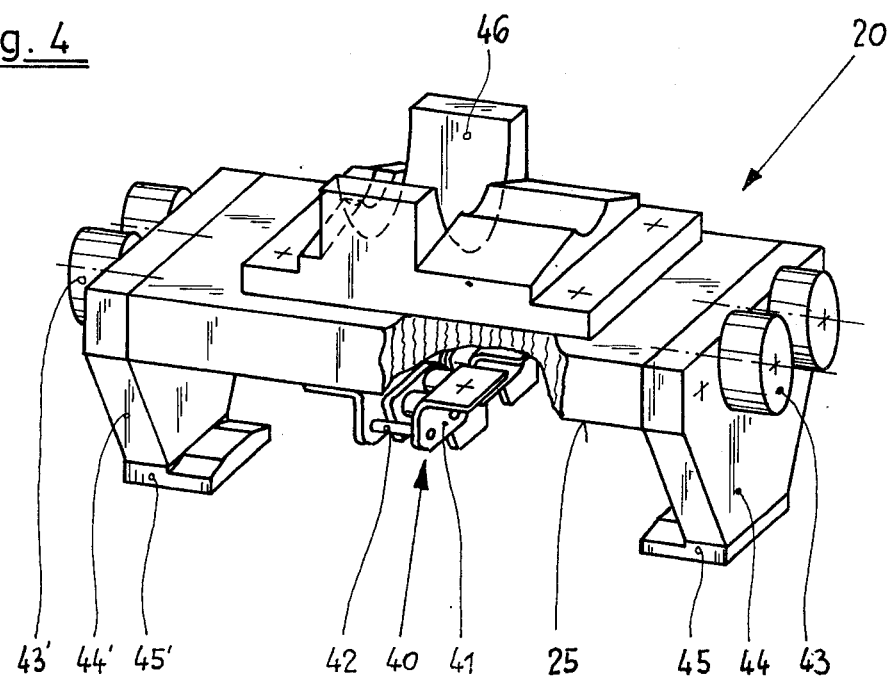

PALLET MAGAZINE

FIELD OF THE INVENTION

The invention relates to a pallet magazine for transporting workpieces and, more particularly, to such a magazine having two endlessly rotating chains supported on spaced sprockets which rotate about horizontal axes and having pallets which carry the workpieces and are adapted to rest on the upper reaches of the chains and hang from the lower reaches of the chains.

BACKGROUND OF THE INVENTION

A pallet magazine of the foregoing type represents the state of the art of pallet magazines. The pallets which rest freely on the upper reach of the endless chains slide, at one of the turning points (or 180° turns) defined by the sprocket wheels around which the chains are looped, completely uncontrolled into a position rotated 180° and then hang from the lower reach of the chains. When the pallets arrive at the other turning point (or 180° turn ), they are supported by the parts which grip around the chains and are rotated again 180° around the sprocket wheels into their original position, so that they now rest freely again on the upper chain reach. During sliding from the resting to the hanging position and also during the transition from the hanging to the resting position, difficulties occur again and again. It frequently happens that a pallet assumes an inclined orientation and then jams, or that the support on the chain members which engage the sprocket wheels does not come off. These breakdowns can be caused by slight damage to the pallets or by adhering chips.

Therefore, the basic purpose of this invention is to provide a pallet magazine in which the rotation of the pallets at the turning points occurs forcibly and under control and thus is functionally safe.

SUMMARY OF THE INVENTION

This purpose is attained inventively by arranging at each turning point (or 180° turn) a gear or the like between and coaxial with the sprocket wheels and rotating at the same speed, which gear engages a short rack or the like which is arranged on the underside of each pallet. In order to assure good engagement between the racks and gears, the pallets are preferably provided with lateral guide rollers, through which they are guided at the turning points by substantially semicircular guide members.

A very inexpensive design of the gears and of the racks is obtained when the gears are roller-chain sprocket wheels and the racks are roller-chain sections which are rigidly mounted on the undersides of the pallets. A problemless feed of the roller-chain sections onto the roller-chain gears is achieved when the first and last roller of each roller-chain section has a smaller diameter than the rollers lying therebetween and than the tooth fillet curves of the roller-chain gears, or alternatively when the first and last roller of each roller-chain section is removed and only the support bolts therefor remain in the roller-chain sections.

To increase the operating safety, it is possible to arrange a guide rail in the plane of the roller-chain gears and between same, which guide rail is received between guide projections on the roller-chain sections and is connected fixedly to the magazine frame. With this, the pallets receive a guide resisting movement transversely to the direction of feed, by which in particular an inclined orientation of the pallets is prevented and no further guideways are necessary in the area where the roller-chain sections are fed onto the roller-chain gears.

The roller-chain gears can be connected by means of a slip clutch to the shaft which carries the sprocket wheels. With this, in the case of a breakdown in operation, damage to the pallet magazine is prevented and the accident risk is reduced, for example, if an operator during loading or unloading touches a pallet which is just running over a turning point, since such pallet is then not moved on.

Pallet magazines of the above-mentioned type are typically equipped with mechanisms for stopping and/or releasing and for storing and/or separating of the loaded and the empty pallets. These mechanisms are conventional and not a part of the invention, and are therefore not discussed in detail herein.

BRIEF DESCRIPTION OF THE DRAWINGS

The invention will be described hereinafter in connection with one exemplary embodiment which is illustrated in the FIGS. 1 to 4.

In the drawings:

FIG. 2 is a sectional view of a turning point taken along the line II—II of FIG. 1a;

FIG. 4 is a perspective view, partly broken away, of a pallet which is a component of the pallet magazine of FIGS. 1a and 1b.

DETAILED DESCRIPTION

Figure 1A:
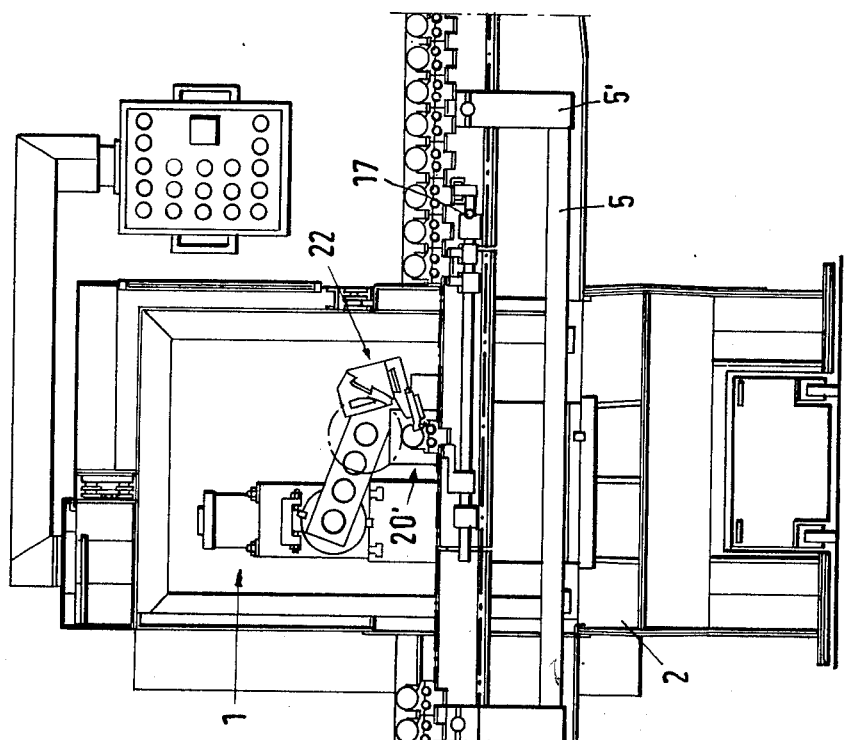
FIGS. 1a and 1b taken together are a side view, partially in section, of a pallet magazine embodying the present invention which is associated with a tool machine.
Figure 1B:
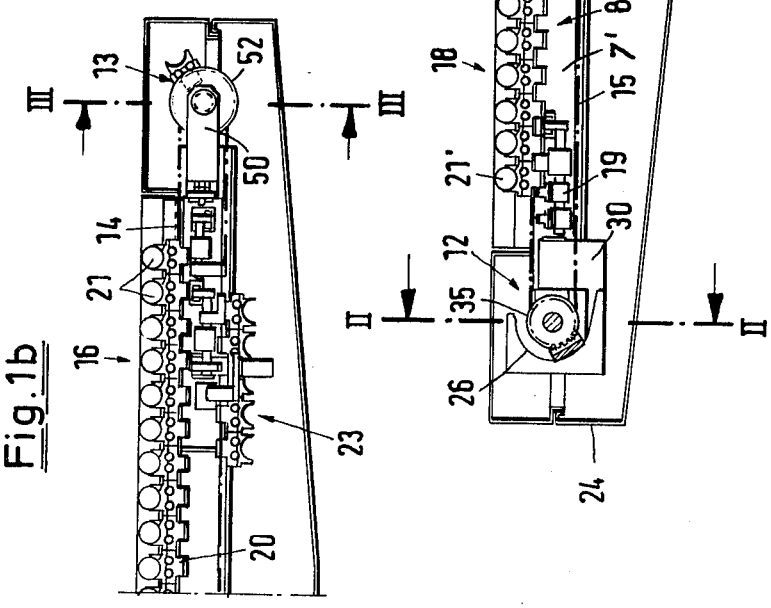

Referring to FIGS. 1a and 1b, a frame 3 for a pallet magazine 4 is secured, for example by screws, on a column 2 of a machine 1 which, in the illustrated embodiment, is a gear-deburring machine. The frame 3 is built of suitable profile parts 5 and 5' and supports the pallet magazine 4 which includes a longitudinal carrier 8 composed of a hollow profile 6 (FIG. 3) and two spaced, flat profiles 7 and 7' (FIGS. 1a and 3). Sprocket wheels 9 and 9' (FIG. 2) and 10 and 10' (FIG. 3) are rotatably supported at the ends of the carrier 8 in a manner described in more detail hereinafter, around which sprocket wheels run two parallel, endless conveyor chains 11 and 11' designated by dash-dotted lines in FIGS. 1a and 1b. The conveyor chains 11 and 11' each turn 180° at the sprocket wheels 9 and 9' and at the sprocket wheels 10 and 10', so that between the respective turning points 12 and 13 there exists an upper conveyor reach 14 defined by portions of the chains 11 and 11' and a lower conveyor reach 15 defined by portions of the chains. The chains 11 and 11' engage and are guided between the respective sprocket wheels 9, 9', 10 and 10' by the top and bottom edges of the flat profiles 7 and 7', as illustrated in FIG. 3.

A plurality of pallets 20 rest freely on the upper conveyor reach 14 and are carried along with the continuously rotating chains 11 and 11' through the friction generated by their own weights. They are each loaded, by hand or by a mechanical device, with a workpiece 21 at a loading station 16. A conventional separating mechanism 17 synchronized with the control of the tool machine 1 ensures that, at any given time, only one pallet 20' is presented to the working station 22, at which working station the workpiece 21 is chucked, machined and then released. The pallet then moves to an unloading station 18 where it is stopped by a conventional blocking mechanism 19 until the machined workpiece 21' is removed manually or by a mechanical mechanism.

While the pallets 20 are stopped at the loading station 16, the working station 22 and the unloading station 18, the conveyor chains 11 and 11' slide beneath the pallets 20. After the blocking mechanism 19 releases a pallet 20, it moves to the first turning point 12 where it is turned 180° and it thereafter hangs on the lower conveyor reach 15 in a manner described hereinafter. The now-hanging pallet 20 is moved by the lower conveyor reach 15 to a storage place 23, from which pallets are fed around the second turning point 13 in a manner described hereinafter to the loading station 16 as space becomes available on the upper conveyor reach 14. The cycle just described then repeats. It is possible to provide the pallet magazine 4, as protection against accidents, laterally, from below, and also at the turning points 12 and 13 with covers 24.

Figure 2:
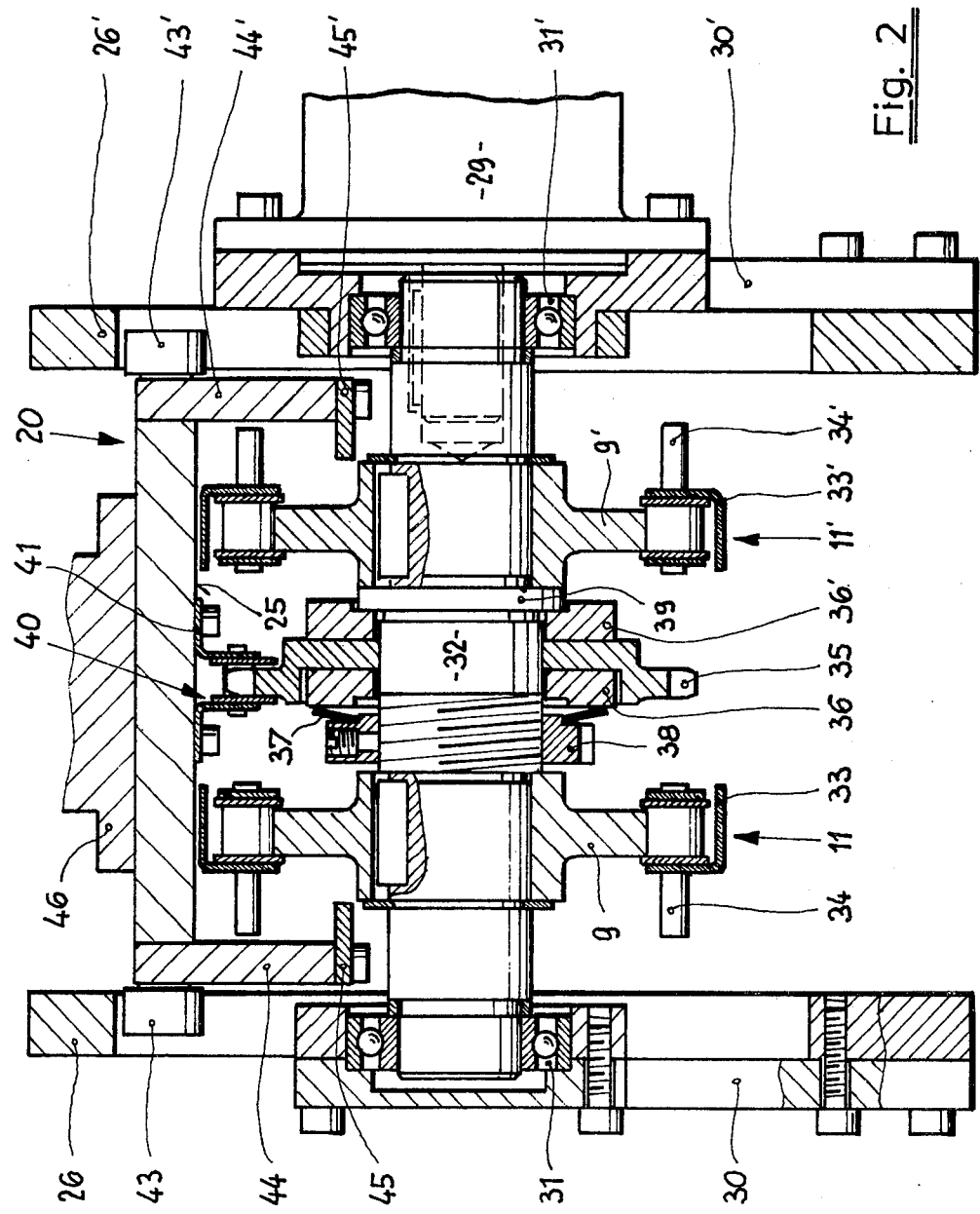
Figure 3:
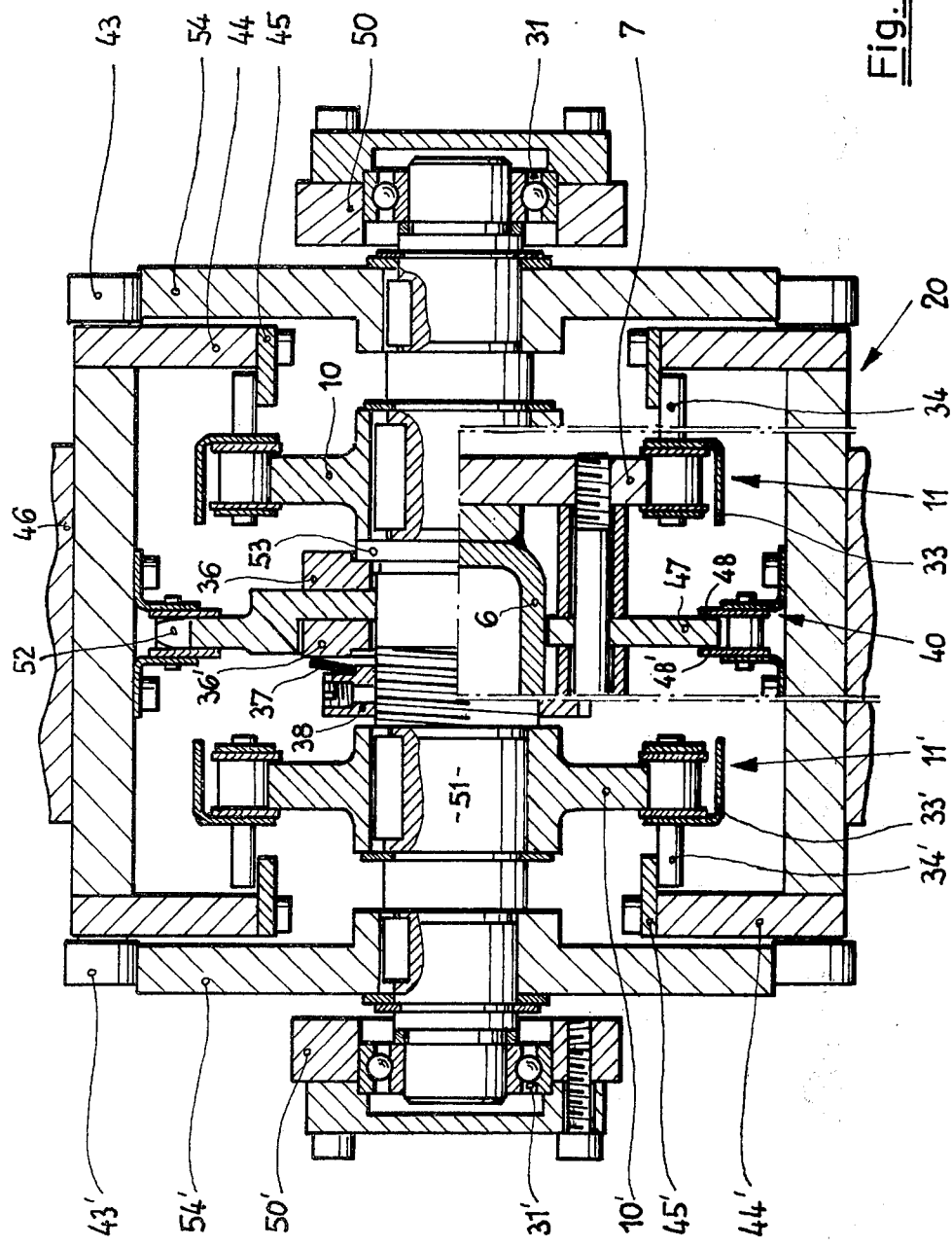
FIG. 3 is a cross-sectional view of another turning point taken along the line III—III of FIG. 1b.

FIG. 2 illustrates the turning point 12 in greater detail. Two arms 30 and 30' which are secured to and extend horizontally away from the longitudinal carrier 8 support ball bearings 31 and 31' in which a shaft 32 is supported rotatably, the shaft 32 being rotationally driven by a motor 29 which is secured on the arm 30'. The two sprocket wheels 9 and 9' are mounted on the shaft 32 so as to be fixed against rotation with respect thereto and spaced from one another. The sprocket wheels 9 and 9' respectively engage the two conveyor chains 11 and 11', which have a plurality of bent support clips 33 and 33' and driving pins 34 and 34' provided at spaced intervals therealong. A third sprocket wheel or gear 35 is provided on the shaft 32 between the sprocket wheels 9 and 9', is rotatable with respect to the shaft 32 and is pressed between two friction disks 36 and 36' disposed between a Belleville spring 37, supported by an adjusting nut 38 threadedly engaging the shaft 32 and a collar 39 provided on the shaft 32. Due to this slip clutch, the sprocket wheel 35 normally rotates with the shaft 32 but can slip with respect thereto when a resistance is encountered without influencing the conveyor drive, and can again rotate with the shaft 32 when the resistance ceases.

The pallets 20 rest with their undersides 25 on the support clips 33 and 33' of the upper conveyor reach 14. Intermediate the points of support on the underside 25 of each pallet 20 a short rack which is preferably a roller-chain section 40 is secured by screws and mounting straps 41. When a pallet 20 arrives at the turning point 12, the sprocket wheel 35 engages the roller-chain section 40 and transports the pallet 20 to the lower conveyor section 15, the pallet 20 being turned 180°. In order to facilitate engagement of the roller-chain section 40 with the sprocket wheel 35 and with a sprocket wheel 52 which will yet be described in detail, the first and last rollers of the roller-chain section 40 are preferably designed with a smaller diameter than the other rollers or a smaller diameter than the tooth fillet curve of the sprocket wheel 35 or, alternatively, they are omitted entirely, leaving only the bolts 42 (FIG. 4) on which such rollers would otherwise be rotationally supported. In the interest of satisfactory tooth engagement, the sprocket wheel 35 preferably has a slightly larger pitch diameter than the sprocket wheels 9 and 9'. Guide rollers 43 and 43' are rotatably, laterally supported on the pallets 20, the axes of which guide rollers extend parallel to the axis of the shaft 32. The rollers 43 and 43' run, at the turning point 12, on spaced, substantially semicircular guide plates 26 and 26' which are also secured on the arms 30 and 30'. With this, lifting off of the pallets 20 during turning is prevented.

Each pallet 20 has plates 45 and 45' (FIG. 4) which are screwed to the underside of downwardly projecting bars 44 and 44', project inwardly, and are spaced below the driving pins 34 and 34' when the pallet 20 rests on the upper conveyor section 14. After the pallet 20 negotiates the turning point 12, the plates 45 and 45' rest on driving pins 34 and 34' and the empty pallets 20 hang from the portions of the conveyor chains 11 and 11' forming the lower conveyor section 15 as illustrated in FIG. 3.

The second turning point 13 (FIG. 3) corresponds substantially in its design with the turning point 12 already described, and equivalent parts are therefore identified with the same reference numerals. Two arms 50 and 50' which are secured to and extend away from the longitudinal carrier 8 support ball bearings 31 and 31' in which a shaft 51 is rotatably supported. The two sprocket wheels 10 and 10' are mounted on the shaft 51 so as to be fixed against rotation and spaced from one another. The sprocket wheels 10 and 10' respectively engage the two conveyor chains 11 and 11'. In order to be able to adjust the tension of the conveyor chains 11 and 11', the arms 50 and 50' are adjustably secured to the longitudinal carrier 8. A third sprocket wheel or gear 52 is provided on the shaft 51 between the two sprocket wheels 10 and 10', is rotatable relative to the shaft 51, and is pressed between two friction disks 36 and 36' disposed between a Belleville spring 37 supported by an adjusting nut 38 threadedly engaging the shaft 51 and a collar 53 provided on the shaft 51. The pitch diameter of the sprocket wheel 52 is selected so that the roller-chain section 40 of a pallet 20 which hangs from the lower conveyor section 15 will be engaged by the sprocket wheel 52, after which the wheel 52 will transport the pallet 20 to the upper conveyor section 14, whereby the pallet 20 is again turned 180°. During transport by the sprocket wheel 52, the pallets 20 are supported on the one hand by the plates 45 and 45' which engage the driving pins 34 and 34' on the conveyor chains 11 and 11', and on the other hand by their guide rollers 43 and 43' which engage round guide disks 54 and 54', which are mounted on the shaft 51 and fixed against rotation with respect thereto. The pallets 20 remain engaged with the sprocket wheel 52 for slightly more than 180°, until they again rest with their undersides 25 on the support clips 33 and 33' of the upper conveyor section 14.

Provided on the upper side of each pallet 20 is an exchangeable fixture 46 for holding the workpieces 21.

Particularly in the case of nonsymmetrical workpieces, the pallets 20 may have a tendency to take on an inclined orientation. To counteract this, a longitudinally extending guide rail 47 (FIG. 3) is arranged on the longitudinal frame 6 and is received between guide projections 48 and 48' provided on the roller-chain section 40. The guide rail 47 extends between and lies in the same plane as the sprocket wheels 35 and 52.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a pallet magazine for transporting workpieces from a loading station to a working station and to an unloading station, said pallet magazine having a frame and two endless rotating chains arranged parallel to one another and which undergo a 180° turn at said loading station and at said unloading station by being guided around sprocket wheels having horizontal axles supported on said frame, a sprocket wheel located at one of said loading station and said unloading station being driven for rotation by a motor, said pallet magazine further including plural pallets, which carry said workpieces thereon, having first means at least partially gripping around said two chains, the improvement comprising wherein said first means is spaced freely below an upper conveyor reach of said chains and hanging freely on a lower conveyor reach of said chains so that a frictional force alone effects a carrying of said pallet with said upper and lower conveyor reaches, and wherein at each 180° turn of said chains, there is arranged a gear oriented coaxially with said sprocket wheels, between said sprocket wheels and rotated at the same speed as said sprocket wheels, which gear engages second means arranged on the underside of each said pallet to effect a controlled driving movement of said pallet from a location on said upper conveyor reach to a location on said lower conveyor reach and vice versa.

2. The pallet magazine according to claim 1, wherein said pallets are each provided with lateral guide rollers, through which they are guided at said 180° turn locations by substantially semicircular guide members provided on said frame.

3. The pallet magazine according to claim 1 or claim 2, wherein said gears are designed as roller-chain sprocket wheels and said second means formed on the undersides of each said pallet are rigidly mounted roller-chain sections.

4. The pallet magazine according to claim 3, wherein the first and last roller of each said roller-chain section has a smaller diameter than the rollers which lie therebetween and than the tooth fillet curves of said roller-chain sprocket wheels.

5. The pallet magazine according to claim 3, wherein the first and last roller of each roller-chain section is omitted.

6. The pallet magazine according to claim 1 or claim 2, wherein said roller-chain sections include guide projections and wherein a guide rail which lies in the plane of said gears and between same, is connected fixedly to said frame and is disposed between said guide projections of said roller-chain sections.

7. The pallet magazine according to claim 1, wherein said gears are connected by means of a slip clutch to said shaft which support the associated and coaxial said sprocket wheels so that if resistance to movement of said pallets occurs, said endless chains will continue to slide relative to the stopped pallets and said slip clutches will operate to stop the movement of said pallet at said 180° turns, said slip clutches effecting a transfer of said pallets between said reaches of said endless chain when there is no resistance to movement of said pallets.

* * * * *